United States Patent [19]

Musacchia

[11] 4,359,934
[45] Nov. 23, 1982

[54] EMERGENCY AIR VENT

[76] Inventor: John Musacchia, P.O. Box 452, Marathon, Fla. 33050

[21] Appl. No.: 209,547

[22] Filed: Nov. 24, 1980

[51] Int. Cl.³ .............................................. F24F 13/18
[52] U.S. Cl. ......................................... 98/118; 251/68
[58] Field of Search ...................... 98/2.01, 29, 32, 37, 98/41 AV, 42 R, 51, 59, 85, 118; 49/2; 251/66, 68, 74; 236/49

[56] References Cited

U.S. PATENT DOCUMENTS

| Re. 13,239 | 5/1911 | Lindemeyer | 98/85 SV |
| 1,301,577 | 4/1919 | Valley | 251/66 |
| 1,849,491 | 3/1932 | Kelly | 251/66 X |
| 1,924,250 | 8/1933 | McGuire | 251/68 X |
| 2,910,079 | 10/1959 | Beeghly | 251/68 X |
| 4,256,257 | 3/1981 | Pinkerton | 98/59 X |

FOREIGN PATENT DOCUMENTS

| 2372360 | 6/1978 | France | 251/68 |
| 17941 | of 1908 | United Kingdom | 98/41 AV |
| 105175 | 4/1917 | United Kingdom | 98/41 AV |
| 523672 | 7/1940 | United Kingdom | 98/41 AV |
| 1344498 | 1/1974 | United Kingdom | 98/59 |

Primary Examiner—Albert J. Makay
Assistant Examiner—Harold Joyce
Attorney, Agent, or Firm—John Maier, III

[57] ABSTRACT

An air vent for emergency introduction of fresh air into a closed building. A dome cover is mounted on a spring-loaded plunger and released by a solenoid upon detection of poisonous gases, smoke or heat, or a lack of oxygen thereby opening the dome cover.

3 Claims, 3 Drawing Figures

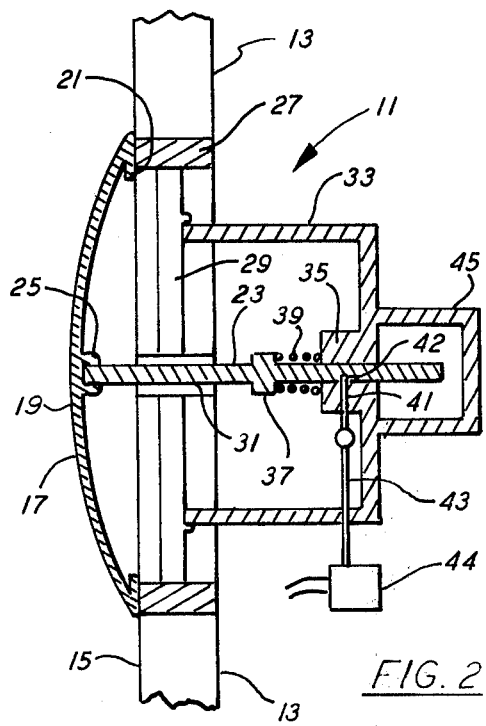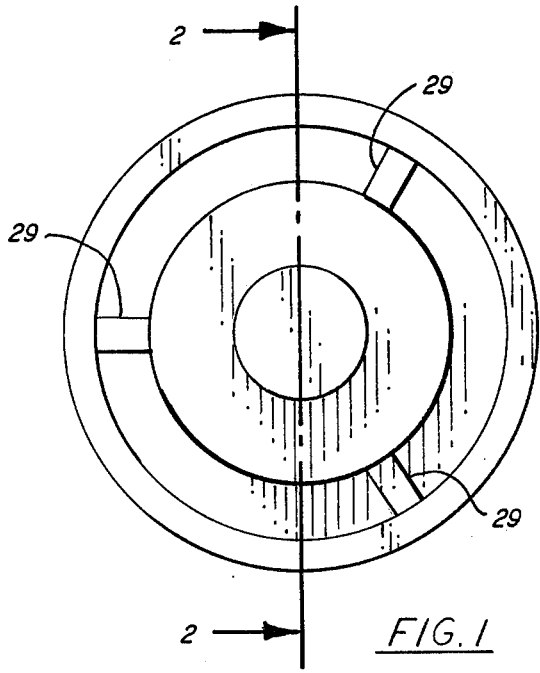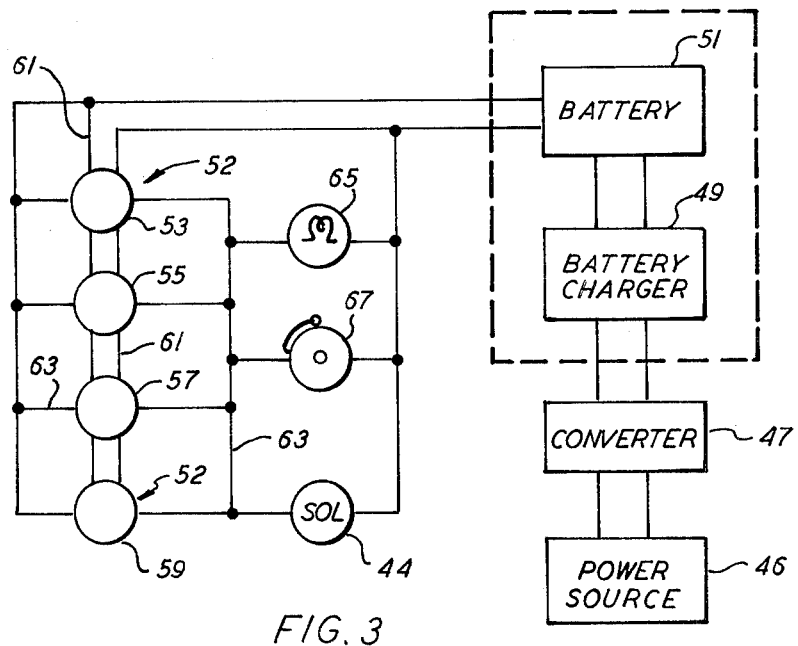

EMERGENCY AIR VENT

BACKGROUND OF THE INVENTION

1. Field of the Invention

The present invention relates to emergency air vents. More particularly, the present invention is directed to emergency air vents for use in trailers or mobile homes which will automatically detect the presence of a hazardous situation, namely an oxygen deficiency which is caused by poison gas, thereby opening the air vent automatically to sustain life within the trailer or mobile home.

2. Description of the Prior Art

Numerous air vents have been used for introducing air into trailers, mobile homes and other residences. Some of these have offered substantial advantages and undoubtedly are useful in saving human life. However, it is important that such a unit be not only operative and functional but inexpensive. Many people, particularly those living in mobile homes, have a limited income, making prohibitive an elaborate unit requiring an expensive installation.

Accordingly, it is a function of this invention to provide a simple air vent which can be easily installed, which is inexpensive to construct and which does not distract from the appearance of the building in which it is located.

The novel features which are considered as characteristics of the invention are set forth with particularity in the appended claims. The invention itself, however, as to its construction of obvious advantages, will best be understood from the following description of the specific embodiment when read with the accompanying drawings.

SUMMARY OF THE INVENTION

The present invention overcomes the disadvantage of the prior art and in so doing provides a simple, durable and inexpensively installed emergency air vent for use in a residence that is activated by an oxygen deficiency detector, smoke detector or gas sensor. A dome cover, preferably formed from molded plastic, is used to cover a circular opening in the building. A plunger extends perpendicular from the inner center of the dome cover and is slidably mounted in a centrally located journal supported by web supports. A spring-loaded collar is placed over the journal to force the shaft outwardly. A pin is slidably fitted through the shaft and the spring-loaded collar to hold the dome cover and shaft in a closed position against the force of the spring. An electrical circuit means is used to detect the presence of a hazardous situation and to release the pin thereby causing the spring to force the dome cover outwardly from the building, permitting air to enter.

DESCRIPTION OF THE DRAWINGS

The present invention may be better understood and its numerous advantages will become apparent to those skilled in the art by reference to the accompanying drawings wherein like reference numerals refer to like elements in the various figures in which:

FIG. 1 is a rear plan view showing the unit as mounted in the wall.

FIG. 2 is a side cross-sectional view of the invention showing the dome cover mounted in the wall of a mobile home or other residence along line 2—2 for FIG. 1.

FIG. 3 is an electrical schematic diagram showing the circuitry for use in operating the device.

DETAILED DESCRIPTION OF THE INVENTION

The emergency air vent 11 is mounted in the wall 13 of a mobile home or residence. On the outside surface 15 of the wall 13, a dome cover 17 is used to prevent air leakage except when air ventilation is required by an emergency situation. The dome cover 17 protrudes only slightly at its centerpoint 19. The dome cover 17 would preferably be molded from a hard plastic material capable of resisting the elements. At its circumference, the dome cover 17 has a wrap-around edge 21 which extends into a flat surface forming a flat ring.

A shaft 23 is mounted substantially concentrically and perpendicularly at the inner side of the dome cover 17. The shaft 23 is affixed to the dome cover 17 by any suitable means, such as a flange 25. A cylindrical sleeve 27, preferably made of hard plastic or steel, is mounted in the wall 13.

The diameter of the cylindrical sleeve 27 is substantially the same size as the diameter of the dome cover 17. The wrap around edge 21 of the dome cover 17 presses against the cylindrical sleeve 27, forming an airtight seal. No sealing gasket is recommended for use between the cylindrical sleeve 27 and the dome cover 17 to assure release of the dome cover 17 when needed. Mounted inside the cylindrical sleeve 27 are three substantially equally spaced webs 29. Supported by the webs 29 concentrically within the cylindrical sleeve 27 is an outer journal 31. A cylindrical mounting frame 33 extends from the webs 29 away from the dome cover 17 and supports an inner journal 35 which is aligned with the outer journal 31. The shaft 23 connected to the dome cover 17 is slidably mounted in both the outer journal 31 and the inner journal 35. Rigidly mounted on the shaft 23 is a disc 37 located between the outer journal 31 and the inner journal 35. Between the outer journal 31 and the disc 37, a spring 39 is located about the shaft 23. An opening 41 is provided through the inner journal 35. A similar opening 42 is provided in the shaft 23. Providing the dome cover 17 is pressed against the cylindrical sleeve 27, the opening 41 and the opening 42 will align with one another. Also, when the shaft 23 is in that position, the spring 39 will be compressed between the disc 37 and the inner journal 35. A pin 43 is placed into the openings 41, 42 to retain the dome cover 17 closed and the spring 39 under compression. The outside end of the pin is affixed to a solenoid 44 which, unless activated, will not move the pin 43 but when electrically activated will withdraw the pin 43 causing the spring 39 to force the dome cover 17 away from the sleeve 27 and the wall of the building 13. A cap 45 encloses the inner end of the shaft 23 to prevent injury to someone contacting the emergency air vent 11.

Referring now to the electrical diagram shown in FIG. 2, power is supplied from the usual utility source 46. It is, however, rectified through a converter 47 to 12-volt DC power. Power from the converter 47 is supplied to a battery charger 49 which constantly maintains a battery 51 for emergency use should the power source 45 not be available. Power from either the converter 47 or the battery 51 is supplied to a series of detectors 52 to actuate the detectors 52. Preferably, the detectors 52 would include specifically a smoke detector 53, an oxygen deficiency detector 55, a gas sensor 57 and a heat detector 59. Each of these detectors 52 serves as a switch which remains open unless a situation develops to actuate that detector 52. By means of electrical lines 61, power is supplied to each of the detectors 52 to permit them to function. Electrical power through the detectors 52 is supplied by lines 63. Should any one of the detectors 52 sense a hazardous situation, it will close the circuit through the detector 52 which is activated by a series of functioning elements such as an emergency light 65 and an alarm 67 as well as the solenoid 44.

Examples of various detectors or sensors suitable for use in this invention may be found in the following United States patent art:

| Inventor | U.S. Pat. No. |
| --- | --- |
| Nagao Abe | 3,500,368 |
| Jensen | 3,447,152 |
| R. J. Jordan | 3,445,669 |
| Deuth | 3,430,220 |
| Vasel | 3,382,762 |

While a preferred embodiment has been shown and described, various modifications and substitutions may be made without departing from the spirit and scope of this invention. Accordingly, it is understood that this invention has been described by way of illustration rather than limitation.

I claim:

1. An emergency air vent for use in an outside wall of a building comprising:
   a dome cover having a wrap-around edge forming a flat-ring surface;
   a cylindrical sleeve for mounting in the building wall and having a diameter substantially equal to the diameter of the flat-ring surface;
   a shaft concentrically affixed perpendicularly to the inside of said dome cover;
   an outer journal concentrically mounted within said cylindrical sleeve;
   a multiplicity of webs extending radially from said outer journal to said cylindrical sleeve to support said outer journal within said cylindrical sleeve;
   a mounting frame affixed to said webs and extending outwardly away from said dome cover;
   an inner journal mounted in said mounting frame, said shaft being slidably mounted in both said inner journal and said outer journal;
   a disc fixedly mounted on said shaft;
   a spring mounted on said shaft between said disc and said inner journal, said spring being compressed between such disc and said inner journal when said flat-ring surface is pressed against said cylindrical sleeve;
   means for retaining said flat-ring surface pressed against said cylindrical sleeve;
   solenoid means connected to said retaining means for releasing said retaining means to permit said spring to force said dome cover away from said cylindrical sleeve;
   an electrically-operated detecting means electrically connected to said solenoid means including an oxygen deficiency detector and a smoke detector for actuating said solenoid means;
   a battery electrically connected to said detecting means for supplying power to said electrically-operated detecting means; and
   a battery charger electrically connected to said battery for maintaining said battery at operating levels.

2. An emergency air vent for use in an outside wall of a building comprising:
   a dome cover having a wrap-around edge forming a flat-ring surface;
   a cylindrical sleeve for mounting in the building wall and having a diameter substantially equal to the diameter of the flat-ring surface;
   a shaft concentrically affixed perpendicularly to the inside of said dome cover;
   an outer journal concentrically mounted within said cylindrical sleeve;
   three substantially equally-spaced webs extending radially from said outer journal to said cylindrical sleeve to support said outer journal within said cylindrical sleeve;
   a cylindrical mounting frame affixed to said webs and extending outwardly away from said dome cover;
   an inner journal mounted on said mounting frame, said shaft being slidably mounted in both said inner journal and said outer journal, said inner journal having an opening extending to said shaft and said shaft having an opening which aligns with the opening in said inner journal when said flat-ring surface is pressed against said cylindrical sleeve;
   a disc fixedly mounted on said shaft;
   a spring mounted on said shaft between said disc and said inner journal, said spring being compressed between said disc and said inner journal when said flat-ring surface is pressed against said cylindrical sleeve;
   a pin adapted slidably to engage the opening in said inner journal and the opening in said shaft to retain said flat-ring surface against said cylindrical sleeve;
   a solenoid connected to said pin for withdrawing said pin to permit said spring to force said flat-ring surface away from said cylindrical sleeve;
   an electrically-operated detecting means electrically connected to said solenoid means including an oxygen deficiency detector, a smoke detector, a gas sensor and a heat detector each for separately actuating said solenoid means;
   a battery electrically connected to said detector means for supplying power to said electrically-operated detecting means;
   a battery charger electrically connected to said battery for maintaining said battery at operating levels; and
   a power converter for converting alternating current to direct current to activate said battery charger, said power converter being electrically connected to said battery charger.

3. An emergency vent according to claim 2 including a warning light and an alarm, both actuated with the solenoid by the electrically-operated detecting means.

* * * * *